United States Patent
Matsuo (10) Patent No.: US 6,360,359 B1
(45) Date of Patent: Mar. 19, 2002

(54) SOURCE CONVERTER PROCESSING METHOD AND MACHINE-READABLE MEDIA STORING IT

(75) Inventor: Takashi Matsuo, Kawasaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,102

(22) Filed: Jan. 27, 1999

(30) Foreign Application Priority Data

Jan. 30, 1998 (JP) .......................................... 10-019991

(51) Int. Cl.[7] ................................................ G06F 9/45
(52) U.S. Cl. ................................................ 717/5; 717/8
(58) Field of Search ............................... 717/4, 5, 6, 7, 717/8, 9, 10

(56) References Cited

U.S. PATENT DOCUMENTS

| | | | | |
|---|---|---|---|---|
| 5,136,709 A | * | 8/1992 | Shirakabe et al. ............. | 717/10 |
| 5,182,807 A | * | 1/1993 | Mizuse et al. .................. | 717/3 |
| 5,432,795 A | * | 7/1995 | Robinson ........................ | 717/4 |
| 5,805,893 A | * | 9/1998 | Sproul et al. ................... | 717/5 |
| 5,946,484 A | * | 8/1999 | Brandes .......................... | 717/2 |
| 6,106,574 A | * | 8/2000 | Baisley et al. .................. | 717/5 |

FOREIGN PATENT DOCUMENTS

| JP | 3-252819 | 11/1991 |
|---|---|---|

OTHER PUBLICATIONS

Yuen et al., "Assembly Language software development system", IEEE, 1997, pp 138–141.*

* cited by examiner

Primary Examiner—Kakali Chaki
(74) Attorney, Agent, or Firm—Scully, Scott, Murphy & Presser (57) ABSTRACT

A source converter processing method is provided for a source converter that converts statements written in an assembly language to statements written in a C language, for example. With regard to the statement of symbol definition written in the assembly language, the method analyzes it to detect the symbol definition, information (i.e., name, definition size and definition address) of which is registered with a symbol table. Then, the registered content of the symbol table is converted to the statements of the C language. With regard to the out-of-symbol-definition-statement, the method detects a reference symbol in connection with memory operation. Then, the method produces a reference address and a terminal address based on information regarding the reference symbol with reference to the symbol table. Thus, the method creates a new symbol based on the reference address and terminal address, so that information regarding the new symbol is registered with the symbol table. Further, with reference to a conversion table that stores information regarding the memory operation and reference address, the method determines whether to enable consecutive statement conversion or single statement conversion, by which the statements of the assembly language are converted to the statements of the C language in an appropriate manner. Incidentally, it is possible to store programs and data regarding the source converter processing method on recording media.

11 Claims, 10 Drawing Sheets

SYMBOL TABLE

| REFERENCE NUMBER | SYMBOL NAME | DEFINITION SIZE | DEFINITION ADDRESS |
|---|---|---|---|
| 1 | MEMORY | | |
| ⋮ | | | |

SYMBOL TABLE

| REFERENCE NUMBER | SYMBOL NAME | DEFINITION SIZE | DEFINITION ADDRESS |
|---|---|---|---|
| 1 | MEMORY | NIBBLE | |
| ⋮ | | | |

SYMBOL TABLE

| REFERENCE NUMBER | SYMBOL NAME | DEFINITION SIZE | DEFINITION ADDRESS |
|---|---|---|---|
| 1 | MEMORY | NIBBLE | 00H.12H |
| ⋮ | | | |

SYMBOL TABLE

| REFERENCE NUMBER | SYMBOL NAME | DEFINITION SIZE | DEFINITION ADDRESS |
|---|---|---|---|
| 1 | MEMORY | NIBBLE | 00H.12H |
| 2 | MEMORY_2 | nibble2 | 00H.12H |
| ⋮ | | | |

SYMBOL TABLE

| REFERENCE NUMBER | SYMBOL NAME | DEFINITION SIZE | DEFINITION ADDRESS |
|---|---|---|---|
| 1 | MEMORY | NIBBLE | 00H.12H |
| 2 | MEMORY_2 | nibble2 | 00H.12H |
| 3 | MEM_00 | nibble | 00H.00H |
| ⋮ | | | |

CONVERSION TABLE

| REFERENCE NUMBER | MEMORY OPERATION | REFERENCE ADDRESS |
|---|---|---|
| 1 | MOV, #0FH | |
| ⋮ | | |

CONVERSION TABLE

| REFERENCE NUMBER | MEMORY OPERATION | REFERENCE ADDRESS |
|---|---|---|
| 1 | MOV, #0FH | 00H. 13H |
| ⋮ | | |

CONVERSION TABLE

| REFERENCE NUMBER | MEMORY OPERATION | REFERENCE ADDRESS |
|---|---|---|
| 1 | MOV, #0FH | 00H. 13H |
| 2 | MOV, #05H | |
| ⋮ | | |

CONVERSION TABLE

| REFERENCE NUMBER | MEMORY OPERATION | REFERENCE ADDRESS |
|---|---|---|
| 1 | MOV, #0FH | 00H. 13H |
| 2 | MOV, #05H | 00H. 12H |
| ⋮ | | |

CONVERSION TABLE

| REFERENCE NUMBER | MEMORY OPERATION | REFERENCE ADDRESS |
|---|---|---|
| 1 | MOV, #0FH | 00H. 13H |
| 2 | MOV, #05H | 00H. 12H |
| 3 | ADD | |
| ⋮ | | |

CONVERSION TABLE

| REFERENCE NUMBER | MEMORY OPERATION | REFERENCE ADDRESS |
|---|---|---|
| 1 | MOV, #0FH | 00H. 13H |
| 2 | MOV, #05H | 00H. 12H |
| 3 | ADD | 00H. 00H, 00H. 12H |
| ⋮ | | |

40

```
        nibble   MEMORY    adder ( 0. 0x12 ) ;
static  nibble2  MEMORY_2  adder ( 0. 0x12 ) ;
static  nibble   MEM_00    adder ( 0. 0x12 ) ;
```

MEMORY_2 = 0x5F;

MEM_00 += MEMORY;

```
MEMORY   NIBBLE     OOH. 12H
MOV      MEMORY+1,  #0FH
MOV      MEMORY,    #05H
ADD      OH,        MEMORY
```

FIG. 9
PRIOR ART

SYMBOL TABLE

| REFERENCE NUMBER | SYMBOL NAME | DEFINITION SIZE |
|---|---|---|
| 1 | MEMORY | NIBBLE |
| 2 | | |
| ⋮ | | |
| n | | |

```
static   nibble           MEMORY_P;

MEMORY_P + &MEMORY;

*(MEMORY_P+1) = 0xF;

*MEMORY_P = 0x5;
```

FIG. 11

SOURCE CONVERTER PROCESSING METHOD AND MACHINE-READABLE MEDIA STORING IT

BACKGROUND OF THE INVENTION

1. Field of the Invention

This invention relates to source converter processing methods that perform conversion of source programs containing language statements for accessing memories. In addition, this invention also relates to machine-readable media that store programs of the source converter processing methods.

This application is based on Patent Application No. Hei 10-19991 filed in Japan, the content of which is incorporated herein by reference.

2. Description of the Related Art

Conventionally, source converters are provided to convert source programs to other computer languages, so that source converter processing methods are provided for processing of the source converters.

For example, the paper of Japanese Patent Application, Publication No. Hei 3-252819 discloses an example of the device for converting the assembler source program to COBOL source program (where "COBOL" is an acronym for "Common Business Oriented Language"). Herein, the source program conversion is effected using operands between the assembler source program and COBOL source program, but it is not always applicable to the high level programming language such as the C language used for the Unix system, for example.

Figure 7:
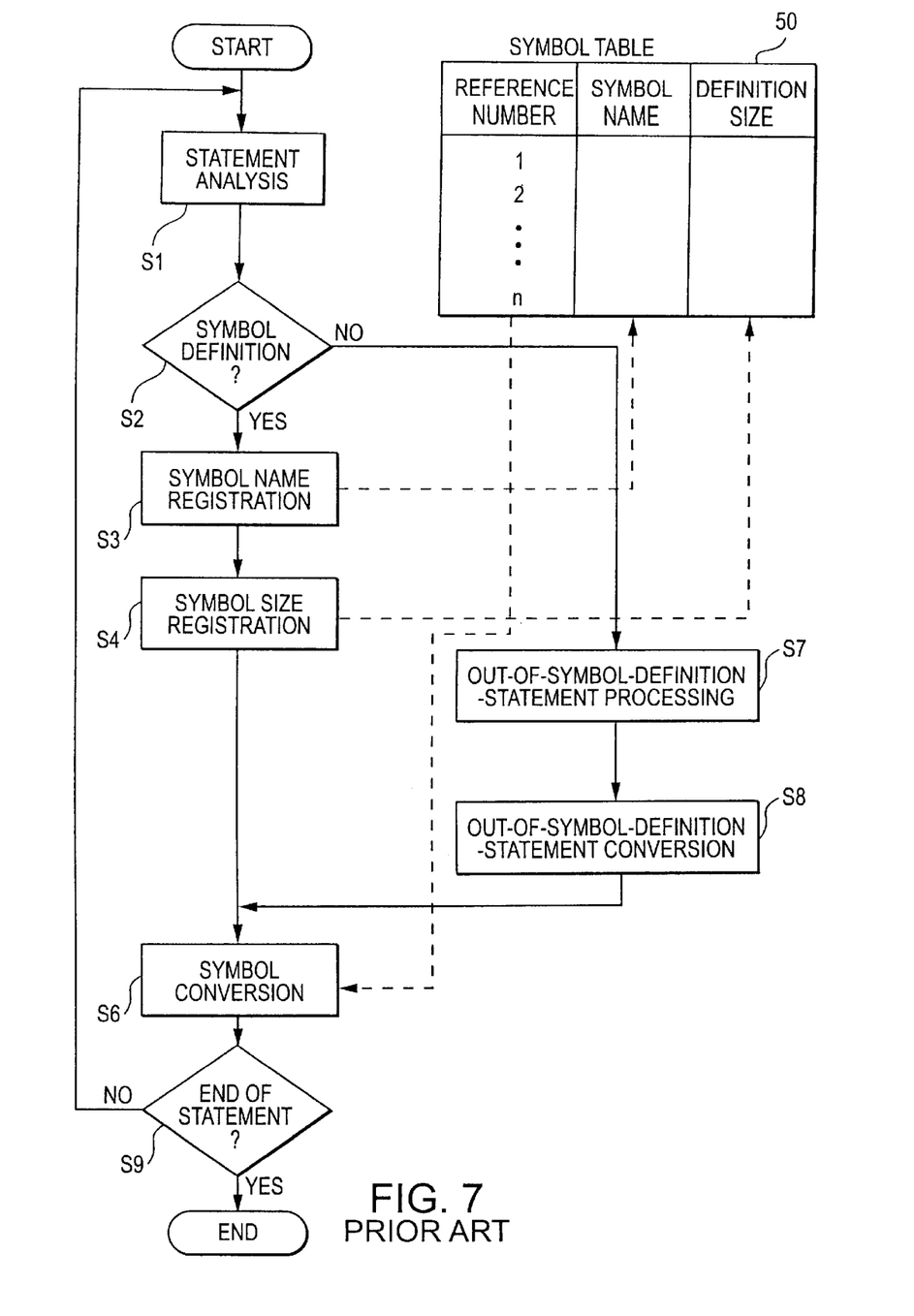
FIG. 7 is a flowchart showing an example of the source converter processing method.
Figure 8:
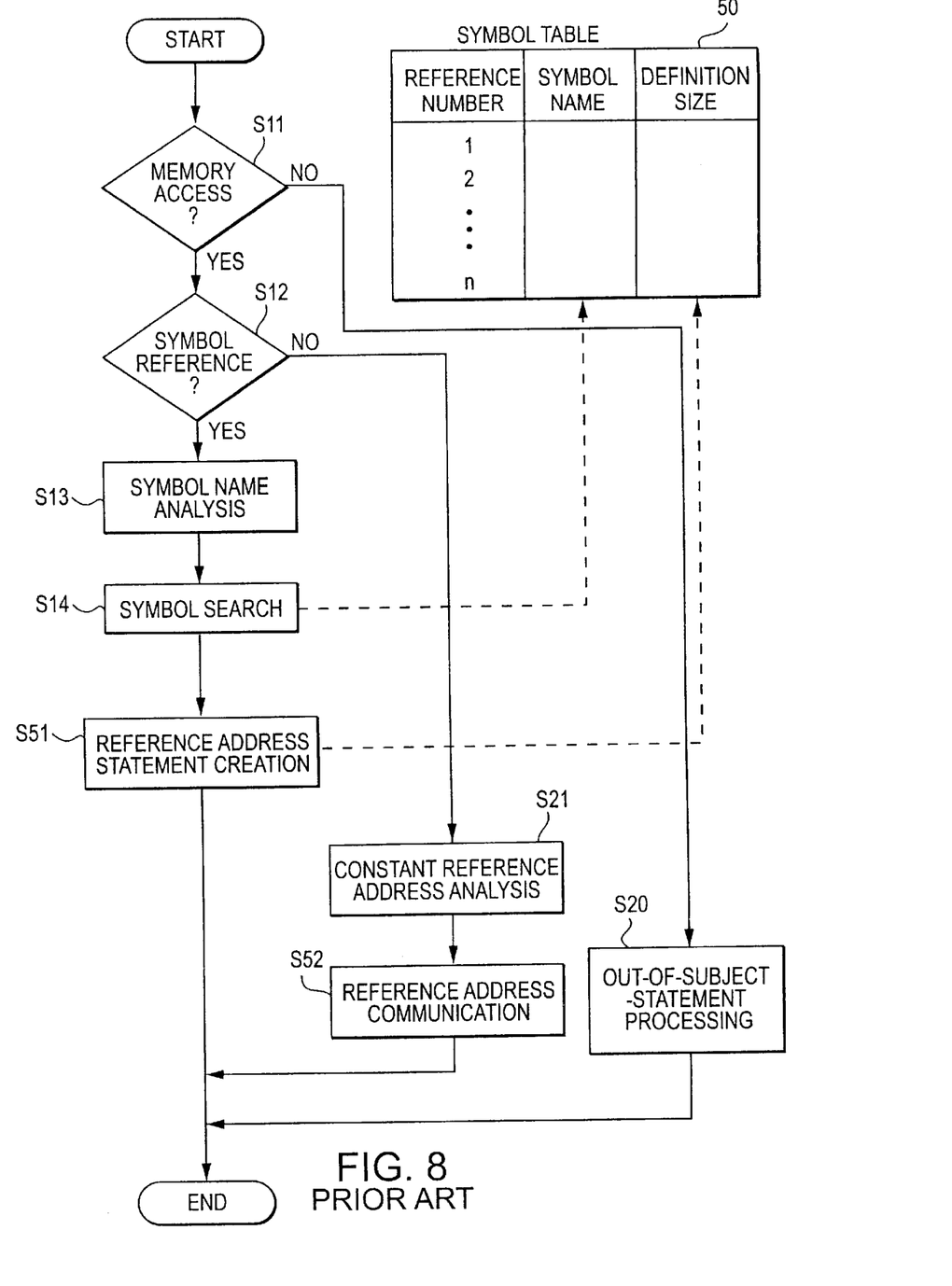
FIG. 8 is a flowchart showing details of an out-of-symbol-definition-statement processing step shown in FIG. 7.

FIG. 7 and FIG. 8 are flowcharts showing an example of the source converter processing method.

Figure 9:
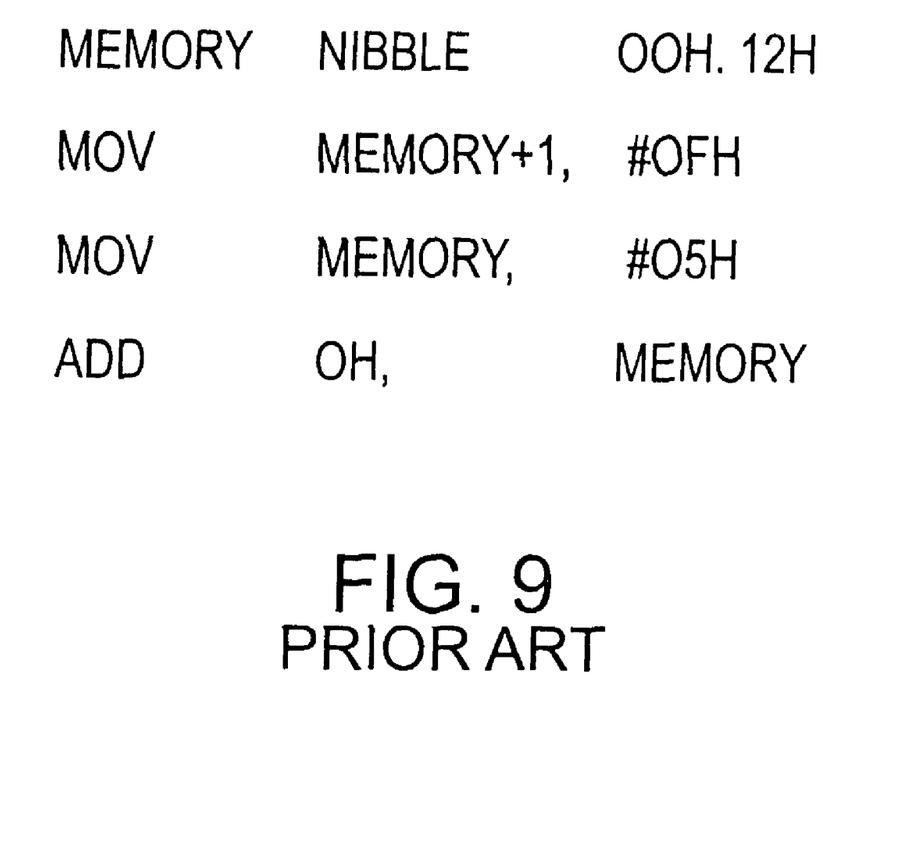
FIG. 9 shows an example of statements of the assembly language that are input to a source converter.
Figure 10:
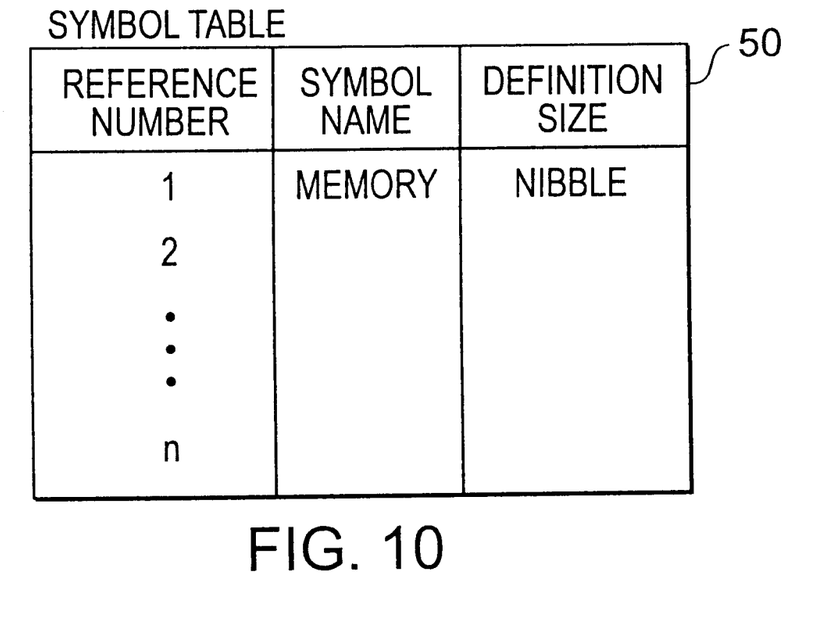
FIG. 10 shows an example of content of a symbol table.
Figure 11:
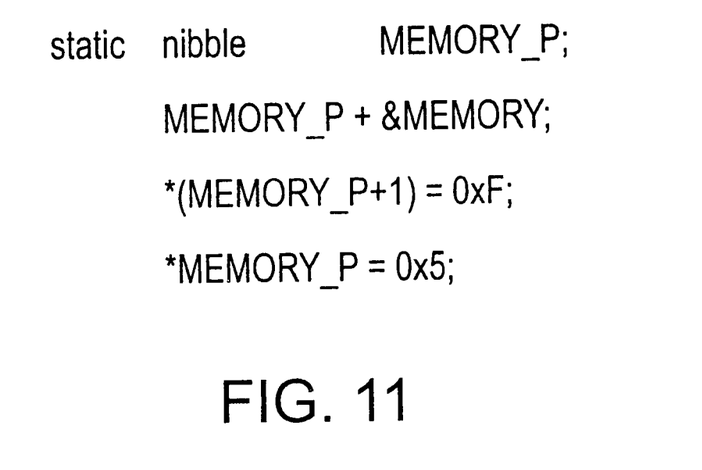
FIG. 11 shows an example of statements of the C language which are produced by converting the statements of the assembly language shown in FIG. 9.

FIG. 9 shows an example of statements written in an assembly language for a 4-bit microcomputer, which is subjected to conversion using the source converter. FIG. 10 shows an example of a symbol table that is created by the source converter when the assembly language is converted to C language. FIG. 11 shows an example of statements written in the C language, which are obtained by converting statements of the assembly language of FIG. 9 by the source converter. In the statements, "NIBBLE" represents a unit of information used in the 4-bit microcomputer. That is, it represents an amount of information having a half of byte. In addition, a symbol "H" following numeric symbols representing an address indicate that the numeric symbols are represented in hexadecimal notation.

In the flowchart of FIG. 7, a reference symbol "S1" designates a statement analysis step that performs analysis of statements, while "S2" designates a symbol definition decision step for making a decision as to whether an input statement corresponds to a statement of symbol definition or not. In addition, a reference symbol "S3" designates a symbol name registration step that detects a symbol name of a definition symbol from the statement of the symbol definition so as to register it with the symbol table, while "S4" designates a symbol size registration step that detects a size of the definition symbol from the statement of the symbol definition so as to register it with the symbol table. "S6" designates a symbol conversion step that performs conversion to statements of symbol definition of the C language in accordance with content of the symbol table and prescribed conversion method. "S7" designates an out-of-symbol-definition-statement processing step that deals with statements of out-of-symbol-definition that are out of the statements of the symbol definition determined by the symbol definition decision step S2. That is, the step S7 performs analysis on statements of such out-of-symbol-definition so as to perform processing required for conversion on the basis of analysis result. "S8" designates an out-of-symbol-definition-statement conversion step that converts statements of the out-of-symbol-definition to statements of the C language. "S9" designates a statement end decision step that makes a decision as to whether the input statement ends or not. Moreover, a reference symbol "50" designates a symbol table that stores symbols and their sizes.

FIG. 8 shows details of the aforementioned out-of-symbol-definition-statement processing step S7 shown in FIG. 7. In FIG. 8, a reference symbol "S11" designates a memory access decision step for making a decision as to whether an input statement corresponds to a statement of memory access or not, while "S12" designates a symbol reference decision step for making a decision as to whether the input statement corresponds to a statement of symbol reference or not. "S13" designates a symbol name analysis step for performing analysis on the statement of the symbol reference to detect a name of a reference symbol, while "S14" designates a symbol search step that extracts the reference symbol from the symbol table 50 on the basis of the name of the reference symbol. "S51" designates a reference address statement creation step that creates statements of C language on the basis of definition size of the reference symbol, which is detected from a column of "definition size" of the symbol table 50, as well as an address of a memory to be referred to. "S21" designates a constant reference address analysis step that performs analysis on the address of the memory referred in the statement of out-of-symbol-reference which is discriminated to be different from the statement of the symbol reference in step S12. "S52" designates a reference address communication step that communicates a reference address in the statement of the out-of-symbol-reference. "S20" designates an out-of-subject-statement processing step that performs processing required for conversion in response to analysis result with respect to statements of out-of-memory-access which are discriminated to be different from statements of memory access.

With reference to FIG. 7 and FIG. 8, operations of the steps will be described in detail. For example, the statement analysis step S1 inputs a statement of the assembly language which describes "MEMORY NIBBLE 00H. 12H". In order to confirm description of the input statement, a decision is made as to whether the input statement is registered as reserved words which are reserved in advance or not, or whether the input statement is registered with the symbol table 50. If the input statement is registered, a type of the input statement is expressed using a type of the corresponding reserved word(s) or a type of the corresponding information stored in the symbol table 50. If analysis result indicates that the input statement is not registered, it is detected that the input statement corresponds to error, which forms a statement description error.

Next, in step S2, a decision is made as to whether the input statement analyzed in step S1 is a statement of symbol definition or not. In this case, the input statement includes "NIBBLE" defining a size of a symbol, which coincides with the reserved word. So, the step S2 determines that the input statement corresponds to the statement of the symbol definition. Then, the symbol name registration step S3 extracts a symbol name of "MEMORY" of the definition symbol from the input statement written in the assembly language, so that the step S3 registers it in a column of "symbol name" of the symbol table 50. In addition, the symbol size registration step S4 registers "NIBBLE" representing the size of the definition symbol in a column of "definition size" of the symbol table 50. As a result, the symbol table 50 stores "MEMORY" as the symbol name and "NIBBLE" as the definition size, which is shown in FIG. 10.

Incidentally, a constant is set to an address designating a memory used for the input statement of the assembly language of "MEMORY NIBBLE 00H. 12H". For this reason, it is impossible to convert the aforementioned input statement of the assembly language to the statement of the symbol definition written in the C language. Thus, error occurs in the symbol conversion step S6.

Next, the step S1 analyzes a statement of the assembly language that describes "MOV MEMORY+1, #0FH". This statement does not coincide with the reserved word(s) of the symbol definition which is registered in advance. Thus, the symbol definition decision step S2 determines that this statement does not correspond to the statement of the symbol definition. So, the system of the source converter processing method transfer control to step S7. The out-of-symbol-definition-statement processing step S7 performs predetermined processing on the aforementioned statement, which is determined to be different from the statement of the symbol definition, in response to analysis result. Then, the out-of-symbol-definition-statement conversion step S8 converts it to a statement of the C language suited to the processing of the out-of-symbol-definition-statement processing step S7.

Next, a description will be given with respect to detailed operations of the out-of-symbol-definition-statement processing step S7 with reference to FIG. 8. Herein, the step S deals with the aforementioned statement of the assembly language which describes "MOV MEMORY+1, #0FH" and which is determined to be different from the statement of the symbol definition. The memory access decision step S11 determines that "MOV" in the statement of the assembly language coincides with the reserved word which is registered in advance to represent an instruction for performing memory access. That is, the step S11 determines the statement as a statement of memory access. Then, the symbol reference decision step S12 determines the statement as a statement of symbol reference because the statement includes "MEMORY+1". Next, the symbol name analysis step S13 detects a name of a reference symbol, i.e., "MEMORY". The symbol search step S14 detects definition size of "NIBBLE" of the reference symbol "MEMORY" with reference to the symbol table 50. At this time, the symbol table 50 stores content shown in FIG. 10. Next, the reference address statement creation step S51 creates statements of the C language for producing a reference address on the basis of the definition size of "NIBBLE" and "MEMORY+1". Specifically, it creates a statement for setting a pointer that describes "static nibble MEMORY_P;", a statement for setting the pointer that describes "MEMORY_P=&MEMORY;" and a statement for reference of the pointer that describes "*(MEMORY_P+1)=0xF;". Thereafter, the system transfers control to step S8 shown in FIG. 7. So, the out-of-symbol-definition-statement conversion step S8 converts them to statements of the C language.

Next, the memory access decision step S11 inputs a statement of the assembly language that describes "MOV MEMORY, #05H". The step S11 determines the statement as a statement of memory access because "MOV" contained in the statement coincides with the reserved word representing an instruction for performing memory access. The symbol reference decision step S12 determines the statement as a statement of a symbol reference because the statement includes "MEMORY". The symbol name analysis step S13 detects a name of the reference symbol of "MEMORY". The symbol search step S14 detects definition size of "NIBBLE" of the reference symbol of "MEMORY" with reference to the symbol table 50. The reference address statement creation step S51 creates a statement of the C language for producing a reference address on the basis of the definition size of "NIBBLE" and "MEMORY". Namely, the step S51 creates a statement for reference of a pointer that describes "MEMORY_P=0x5;". Next, the out-of-symbol-definition-statement conversion step S8 (see FIG. 7) converts it to a statement of the C language.

Next, the memory access decision step S11 inputs a statement of the assembly language that describes "ADD 0H, MEMORY". Herein, "ADD" coincides with the reserved word representing an instruction for performing memory access, so the step S11 determines the statement as a statement of memory access. In addition, "0H" does not represent a symbol but a constant, so the symbol reference decision step S12 determines the statement to be different from a statement of symbol reference. So, the system transfers control to step S21. The constant reference address analysis step S21 produces a reference address of "00H. 00H" based on "0H" of the statement. Such a constant address cannot be converted to a statement of the C language. So, the reference address communication step S52 communicates the reference address of "00H. 00H" as an error message. In this case, the system skips the out-of-symbol-definition-statement conversion step S8 shown in FIG. 7.

The aforementioned steps are repeated until the statement end decision step S9 shown in FIG. 7 detects that no further statement is input.

By performing the aforementioned steps, the statements of the assembly language shown in FIG. 9 are converted to the statements of the C language shown in FIG. 11.

However, the aforementioned source converter processing method as shown in FIG. 7 and FIG. 8 suffers from a variety of problems, which will be described below.

In the case where the assembly language which is a low-level language is converted to the C language which is a high-level language, the source converter processing method does not have a capability of converting statements of symbol definition, which are written in the assembly language and whose absolute addresses are designated, to statements of the C language. For this reason, corrections should be required for the source program of the C language after the conversion.

In addition, the aforementioned source converter processing method does not have a capability of converting statements of the assembly language, in which addresses are not designated using symbols but are designated using constants, to statements of the C language. Thus, the method requires corrections on the source program of the C language after the conversion.

Further, in the case where conversion is performed on statements of the assembly language that is designed to perform memory access by designating relative addresses of symbols, the aforementioned source converter processing method converts them to statements of the C language without securing consecutive memory areas. For this reason, when the source program after the conversion is complied and is then executed, there occur incorrect operations.

SUMMARY OF THE INVENTION

It is an object of the invention to provide a source converter processing method that is capable of performing conversion on statements of symbol definition using absolute addresses and statements of address designation using constants.

It is another object of the invention to provide a source converter processing method that is capable of converting statements of memory access designating relative addresses to statements that do not cause incorrect operations when executing source programs after compilation.

It is a further object of the invention to provide machine-readable media storing the source converter processing method.

A source converter processing method of this invention is designed to have a capability of converting statements of symbol definition designating absolute addresses and statements of address designation using constants, both of which are written in assembly languages.

With regard to the statement of symbol definition written in the assembly language, the method analyzes it to detect the symbol definition, information (i.e., name, definition size and definition address) of which is registered with a symbol table. Then, the registered content of the symbol table is converted to the statements of the C language, for example.

With regard to the out-of-symbol-definition-statement, the method detects a reference symbol in connection with memory operation. Then, the method produces a reference address and a terminal address based on information regarding the reference symbol with reference to the symbol table. So, the method creates a new symbol based on the reference address and terminal address, so that information regarding the new symbol is registered with the symbol table. Further, with reference to a conversion table that stores information regarding the memory operation and the reference address, the method determines whether to enable consecutive statement conversion or single statement conversion, by which the statements of the assembly language are converted to the statements of the C language in an appropriate manner.

Incidentally, it is possible to store programs and data regarding the source converter processing method on recording media.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

Figure 1:
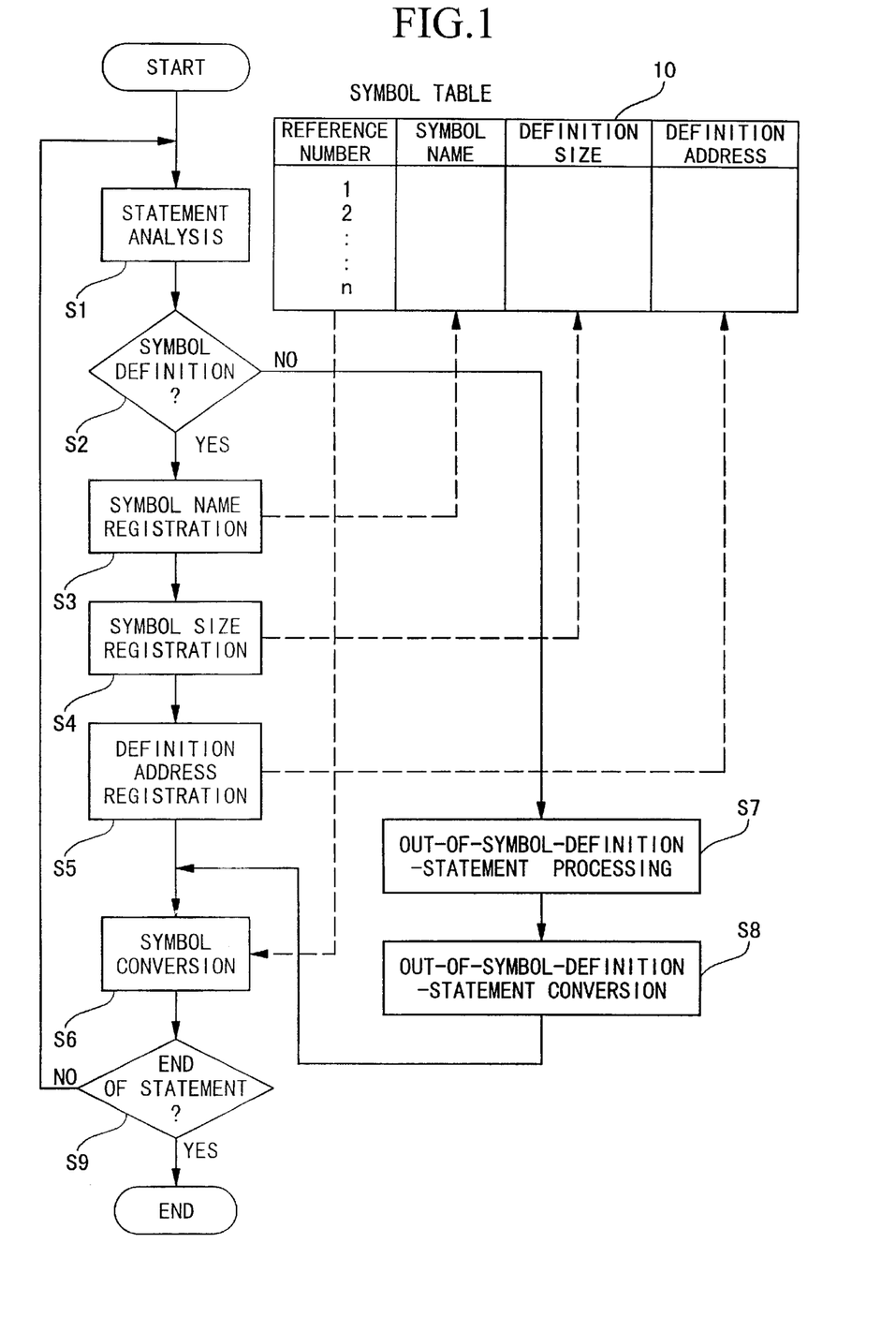
FIG. 1 is a flowchart showing a source converter processing method in accordance with embodiment of the invention.
Figure 2:
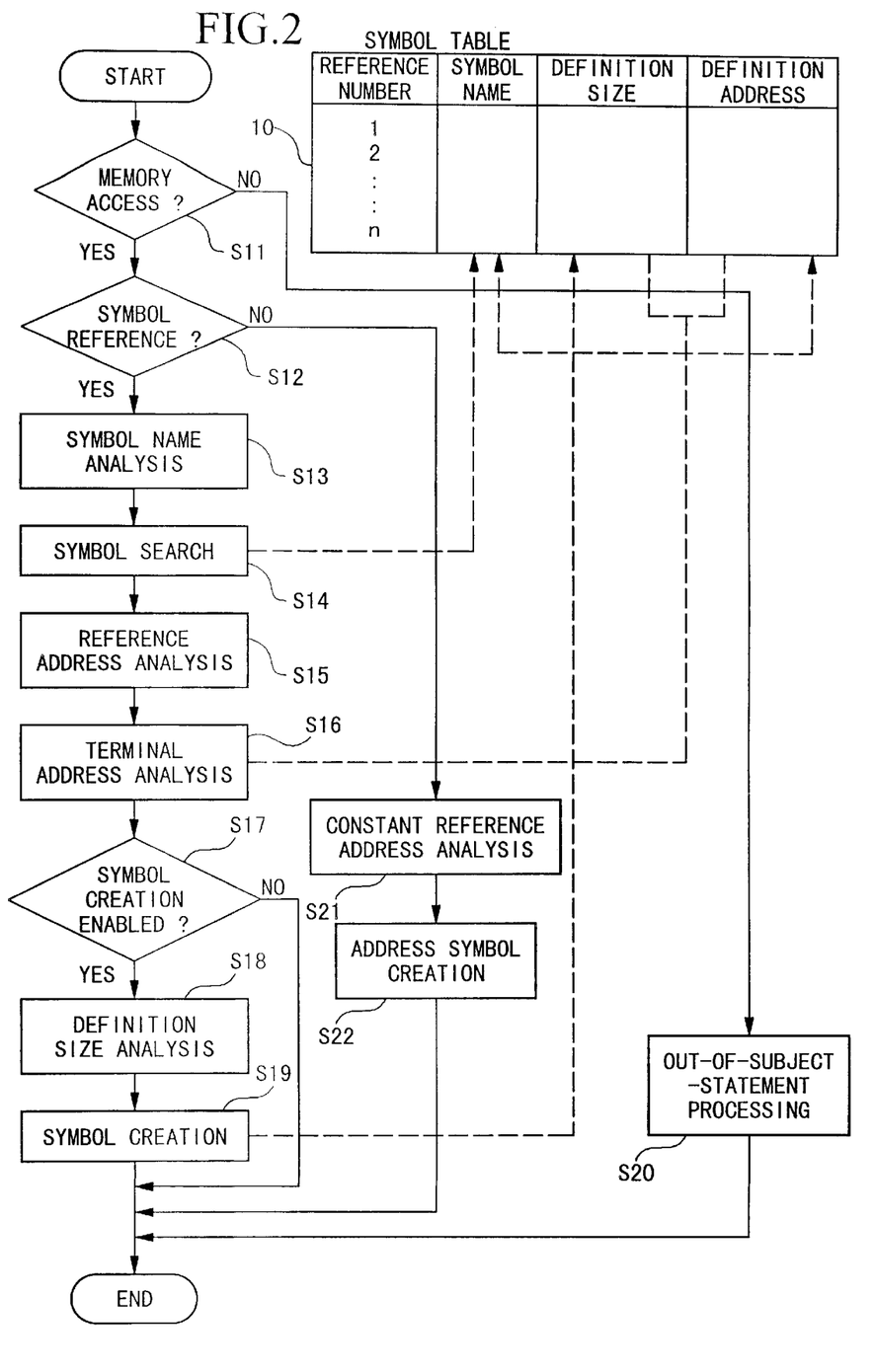
FIG. 2 is a flowchart showing details of an out-of-symbol-definition-statement processing step shown in FIG. 1.
Figure 3:
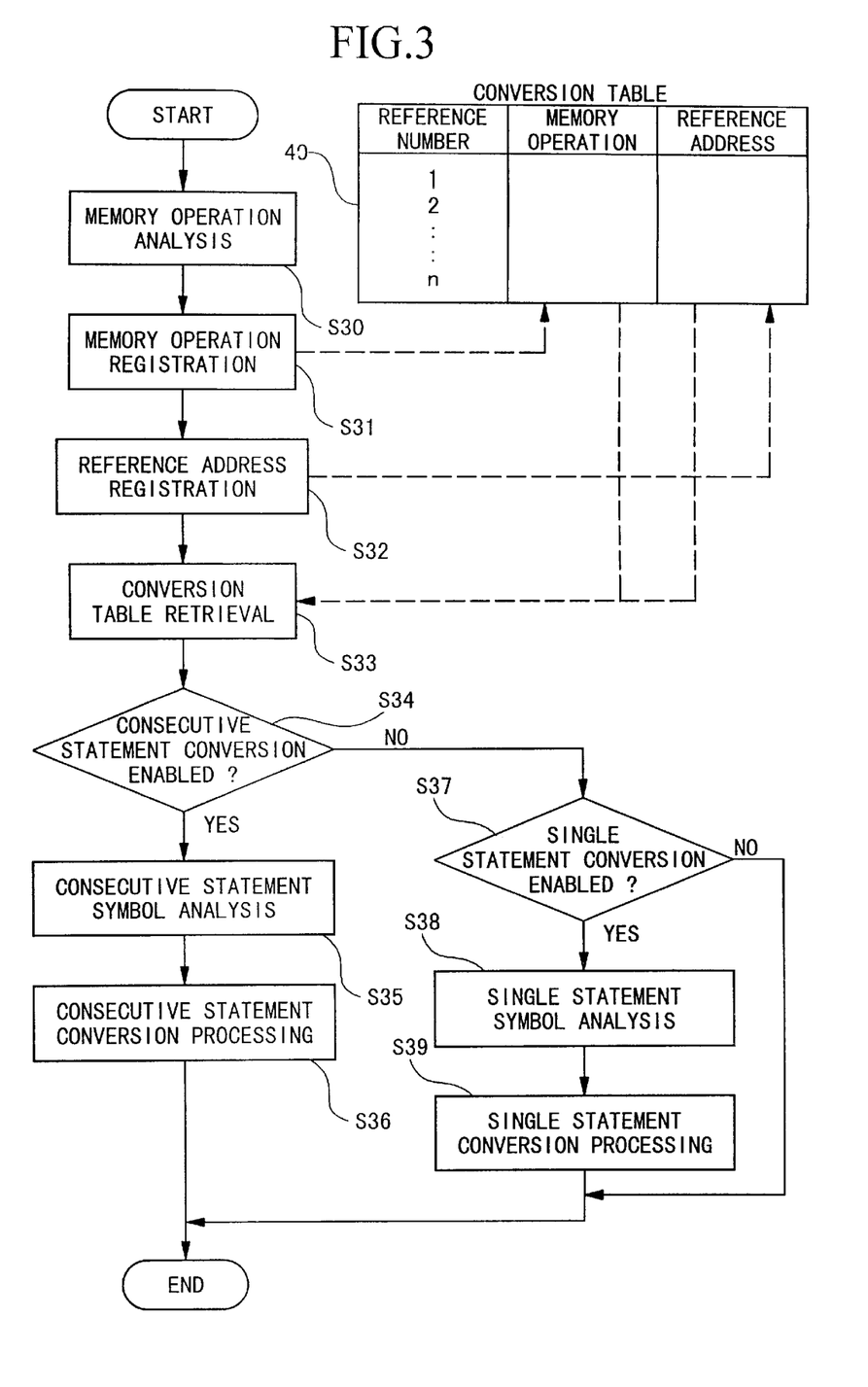
FIG. 3 is a flowchart showing details of an out-of-symbol-definition-statement conversion step shown in FIG. 1.
Figure 4A:
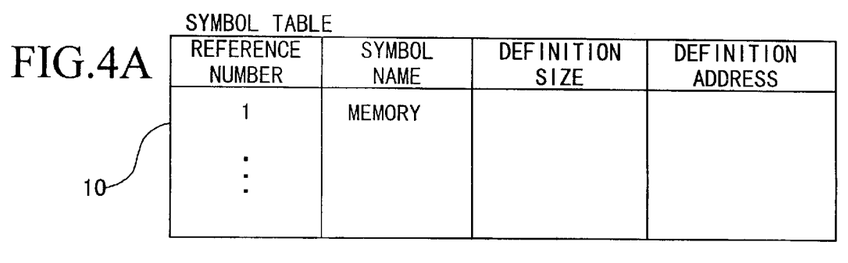
FIG. 4A, FIG. 4B, FIG. 4C, FIG. 4D and FIG. 4E show a manner of transition of contents of a symbol table.
Figure 4B:
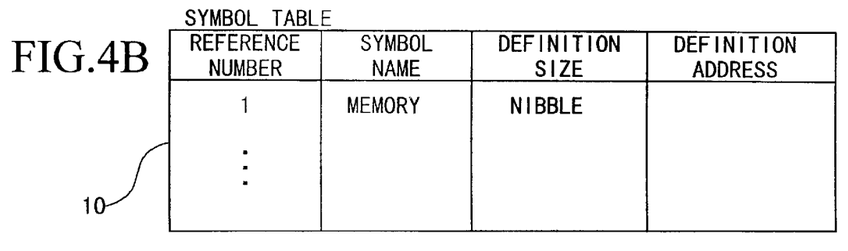
Figure 4C:
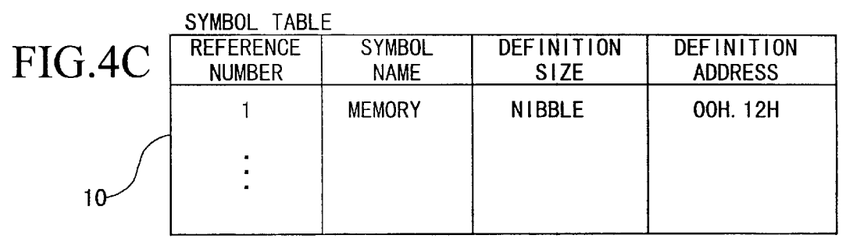
Figure 4D:
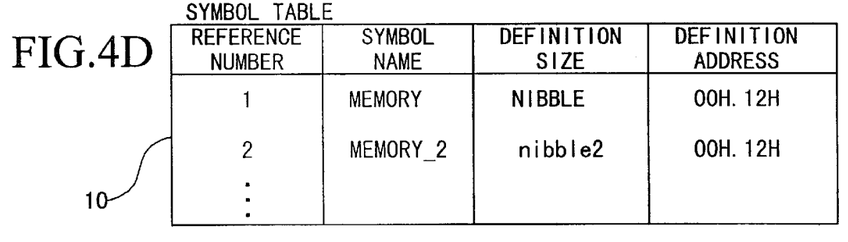
Figure 4E:
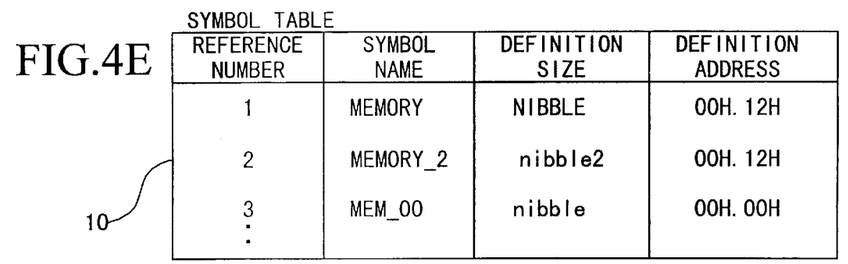

FIG. 1 is a flowchart showing a source converter processing method in accordance with preferred embodiment of the invention. FIG. 2 is a flowchart showing details of the out-of-symbol-definition-statement processing step S7 shown in FIG. 1. FIG. 3 is a flowchart showing details of the out-of-symbol-definition-statement conversion step S8 shown in FIG. 1. FIG. 4A to FIG. 4E show a manner of transition of contents of a symbol table, which is created when the assembly language is converted to the C language. FIG. 5A to FIG. 5F show a manner of transition of contents of a conversion table, which is created when the assembly language is converted to the C language. In the present embodiment, the aforementioned statements of the assembly language shown in FIG. 9 are converted to statements of the C language which are shown in FIG. 6.

In FIG. 1, steps identical to those shown in FIG. 7 are designated by the same reference symbols; hence, the description thereof will be omitted. Different from the aforementioned source converter processing method shown in FIG. 7, the source converter processing method shown in FIG. 1 newly introduces a definition address registration step S5. In addition, the method of FIG. 1 uses a new version of a symbol table 10 which contains a column of "definition address" in addition to the columns provided in the aforementioned symbol table 50.

The definition address registration step S5 detects addresses of definition symbols from statements of the assembly language so as to register them with the symbol table 10. Incidentally, the symbol table 10 is constructed by a column of "reference number" for managing an order to sequentially register symbols, a column for registration of "symbol name", a column for registration of "definition size" and the column for registration of "definition address".

Next, a description will be given with respect to operations of the source converter processing method of the present embodiment with reference to FIG. 1.

First, a description will be given with respect to conversion process of the statement of the assembly language describing "MEMORY NIBBLE 00H. 12H".

The statement analysis step S1 analyzes the statement of "MEMORY NIBBLE 00H. 12H". Herein, "NIBBLE" contained in the statement coincides with the symbol of the reserved word which is registered in advance, so the symbol definition decision step S2 determines the statement as a statement of symbol definition. Next, the symbol name registration step S3 registers a name "MEMORY" of a definition symbol with the column of "symbol name" of the symbol table 10 (see FIG. 4A). The symbol size registration step S4 registers the size "NIBBLE" of the definition symbol with the column of "definition size" of the symbol table 10 (see FIG. 4B). Next, the definition address registration step S5 registers a definition address "00H. 12H" of the statement with the column of "definition address" of the symbol table 10 (see FIG. 4C).

Next, the symbol conversion step S6 converts the aforementioned statement of the assembly language to a statement of the C language describing "nibble MEMORY addr (0.0x12)" (see FIG. 6). In this conversion, "MEMORY NIBBLE" is converted to "nibble MEMORY" at first. Then, "00H. 12H" is subjected to conversion with reference to the registered content of the symbol table 10. That is, with reference to the column of "definition address" that registers "00H. 12H" therein, it is converted to "addr (0.0x12)".

According to the converted statement written in the C language, it is possible to locate a symbol "MEMORY" at an address designated by "0.0x12" with the size of "NIBBLE".

Next, with reference to FIG. 2, a description will be given with respect to processing that is performed with regard to statements that the symbol definition step S2 determines to be different from statements of symbol definition. In FIG. 2, steps identical to those of FIG. 8 are designated by the same reference symbols; hence, the description thereof will be omitted. Herein, the flowchart of FIG. 2 provides steps S15 to S19 and S22 in addition to the foregoing steps S11 to S14, S20 and S21 shown in FIG. 8. Specifically, FIG. 2 shows the reference address analysis step S15, terminal address analysis step S16, symbol creation decision step S17, definition size analysis step S18, symbol creation step S19 and address symbol creation step S22.

Next, a description will be given with respect to conversion process for the statement of the assembly language describing "MOV MEMORY+1, #0FF" (see FIG. 9).

The statement analysis step S1 performs statement analysis on the above statement of the assembly language. Then, the symbol definition decision step S2 determines the statement to be different from a statement of symbol definition. So, system of the present embodiment transfers control to step S7, which in turn proceeds to step S11 shown in FIG. 2. Thus, the memory access decision step S11 deals with the statement of the assembly language describing "MOV MEMORY+1, #0FH". Herein, "MOV" of the statement coincides with the reserved word representing a symbol for performing memory access, so the step S11 determines the statement as a statement of memory access. From "MEMORY+1" contained in the statement, the symbol reference decision step S12 determines the statement as a statement of symbol reference.

Next, the symbol name analysis step S13 detects a name of the symbol "MEMORY". With reference to the symbol table (see FIG. 4C), the symbol search step S14 obtains the definition size "NIBBLE" and definition address "00H. 12H". Then, the reference address analysis step S15 produces a reference address based on "MEMORY+1" and the definition address "00H. 12H" of "MEMORY" which is extracted from the symbol table 10. Herein, the definition address of "MEMORY" is "00H. 12H" while the reference address is "MEMORY+1". Thus, reference address should be "00H. 12H+1", which is identical to "00H. 13H".

The terminal address analysis step S16 produces a terminal address based on the definition address "00H. 12H" and definition size "NIBBLE", which are extracted from the symbol table 10 with respect to the reference symbol. Herein, the definition address is "00H. 12H" while the definition size is "NIBBLE", which represents "1". Thus, it is possible to produce the terminal address by calculation of "00H. 12H+1−1", which is identical to "00H. 12H".

The symbol creation decision step S17 makes a decision whether to create a new symbol or not. This decision is made by making a decision as to whether in the processing of the previous statement which is processed prior to the statement presently processed, the reference address and terminal address have been produced or not. In this case, the reference address and terminal address are not obtained prior to the processing of the present statement describing "MOV MEMORY+1, #0FH". For this reason, the step S17 determines that the new symbol is not created. Thus, the system of the present embodiment ends processing of FIG. 2, i.e., processing of the step S7.

Next, operations of the out-of-symbol-definition-statement conversion step S8 will be described with reference to FIG. 3. Herein, there is provided a conversion table 40 which is constructed by three columns, i.e., a column of "reference number", a column of "memory operation" and a column of "reference address", contents of which are sequentially changed as shown in FIG. 5A to FIG. 5F.

First, a memory operation analysis step S30 extracts from the aforementioned statement, "MOV" and "#0FH" which correspond to operation of a memory. A memory operation registration step S31 registers extracted "MOV" and "#0FH" with the column of "memory operation" of the conversion memory 40 (see FIG. 5A). A reference address registration step S32 registers the aforementioned reference address "00H. 13H", which is produced by the reference address analysis step S15 shown in FIG. 2, with the column of "reference address" of the conversion table 40 (see FIG. 5B).

Next, a conversion table retrieval step S33 performs retrieval operation on content of the conversion table 40. Then, a consecutive statement decision step S34 makes a decision as to whether the presently registered content of the conversion table 40 can be converted to a single statement or not. In this case, the conversion table 40 does not store multiple statements (see FIG. 5B). So, the step S34 determines that the present content of the conversion table 40 cannot be converted to a single statement. Thus, the system of the present embodiment transfers control to step S37 of single statement decision. Incidentally, no symbol exists to refer to the reference address "00H. 13H", so the single statement decision step S37 determines that single statement conversion is not enabled. Thus, the system of the present embodiment ends processing of the out-of-symbol-definition-statement conversion step S8.

Next, a description will be given with respect to conversion process for the statement of the assembly language describing "MOV MEMORY, #05H" (see FIG. 9).

The statement analysis step S1 analyzes the above statement. The symbol definition decision step S2 determines that the statement does not correspond to a statement of symbol definition. However, the statement coincides with the reserved word representing an instruction for memory access, which is registered in advance, so the memory access decision step S11 determines that the statement corresponds to a statement of memory access. The statement includes a symbol name of "MEMORY", so the symbol reference decision step S12 determines that the statement corresponds to a statement of symbol reference. Thus, the symbol name analysis step S13 obtains a name of a reference symbol of "MEMORY".

Based on the name of the reference symbol of "MEMORY", the symbol search step S14 extracts the definition size "NIBBLE" and definition address "00H. 12H" from the symbol table 10 with respect to the reference symbol.

Based on the definition address extracted from the symbol table 10, the reference address analysis step S15 produces a reference address "00H. 12H".

Then, the terminal address analysis step S16 produces a terminal address "00H. 12H" on the basis of the reference address and definition size.

The above terminal address "00H. 12H" which is produced with respect to the presently processed statement coincides with the previous terminal address which has been produced with respect to the previous statement processed prior to the presently processed statement. In addition, the terminal address coincides with the reference address (i.e., "00H. 12H"). So, the symbol creation decision step S17 determines to initiate creation of a new symbol.

The definition size analysis step S18 produces a definition size for the new symbol based on a difference between the reference address and terminal address. Then, the symbol creation step S19 registers a name of the new symbol of "MEMORY_2" with the symbol table 10 (see FIG. 4D).

In FIG. 3, the memory operation analysis step S30 extracts "MOV" and "#05H", which correspond to operation of the memory, from the statement. The memory operation registration step S31 registers extracted "MOV" and "05H" with the column of "memory operation" of the conversion table 40 (see FIG. 5C). The reference address registration step S32 registers the reference address "00H. 12H", which is produced by the aforementioned reference address analysis step S15, with the column of "reference address" of the conversion table 40 (see FIG. 5D).

Next, the conversion table retrieval step S33 performs retrieval operation on the content of the conversion table 40. Then, the consecutive statement decision step S34 makes a decision as to whether the registered content of the conversion table 40 can be converted to a single statement or not. In this case, the conversion table 40 stores multiple statements (see FIG. 5D) which have not been yet processed. So, the step S34 determines that the registered content of the conversion table 40 can be converted to a single statement.

So, the system of the present embodiment transfers control to step S35 of consecutive statement symbol analysis. The consecutive statement symbol analysis step S35 recognizes that the symbol "MEMORY_2" created by the symbol creation step S19 refers to the reference addresses "00H. 13H" and "00H. 12H". Then, a consecutive statement conversion processing step S36 converts it to a statement of the C language describing "MEMORY_2=0x5F;".

After completion of the step S36 shown in FIG. 3, the system of the present embodiment transfers control to step S6 shown in FIG. 1. The symbol conversion step S6 converts the content of the symbol table 10 (see FIG. 4D) to a statement of the C language describing "static nibble2 MEMORY_2 addr (0.0x12);".

Next, a description will be given with respect to conversion process for the statement of the assembly language describing "ADD 0H, MEMORY" (see FIG. 9).

The statement analysis step S1 analyzes the above statement. The symbol definition decision step S2 determines that the statement of "ADD 0H, MEMORY" does not correspond to a statement of symbol definition. Then, the system of the present embodiment transfers control to step S11 shown in FIG. 2. The statement coincides with the reserved word representing an instruction for memory access which is registered in advance, so the memory access decision step S11 determines that the statement corresponds to a statement of memory access. Herein, the statement contains a reference address of "0H", so the symbol reference decision step S12 determines that the statement does not refer to the symbol. So, the system of the present embodiment transfers control to step S21. The constant reference address analysis step S21 produces a reference address "00H. 00H" based on the statement.

The address symbol creation step S22 creates a name of a new symbol of "MEM_00" based on the reference address "00H. 00H". In addition, the step S22 sets a definition size "nibble" and a definition address "00H. 00H". So, the step S22 registers them with the symbol table 10 (see FIG. 4E).

After completion of the step S22 shown in FIG. 2, the system of the present embodiment transfers control to step S30 shown in FIG. 3. The memory operation analysis step S30 extracts "ADD", which corresponds to operation of the memory, from the statement. Then, the memory operation registration step S31 registers extracted "ADD" with the column of "memory operation" of the conversion table 40 (see FIG. 5E).

Figure 5A:
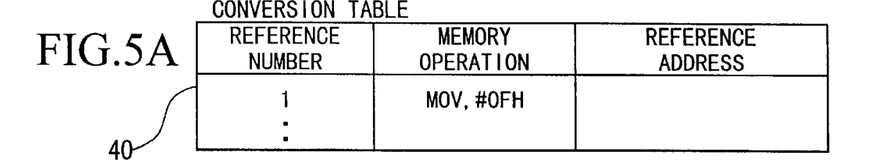
FIG. 5A, FIG. 5B, FIG. 5C, FIG. 5D, FIG. 5E and FIG. 5F show a manner of transition of contents of a conversion table.
Figure 5B:
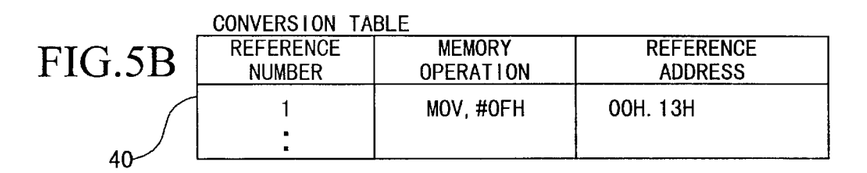
Figure 5C:
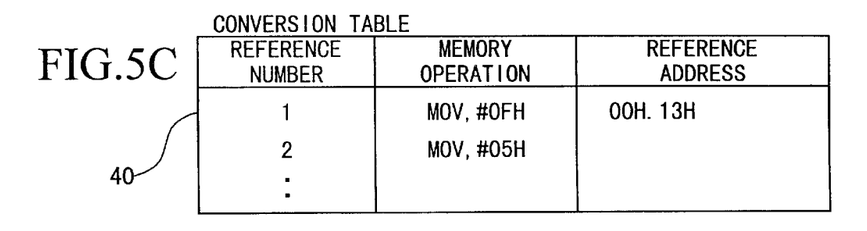
Figure 5D:
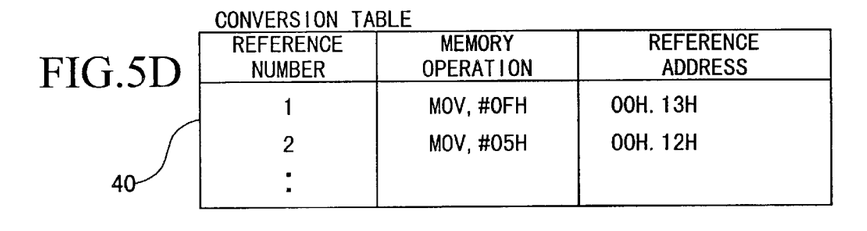
Figure 5E:
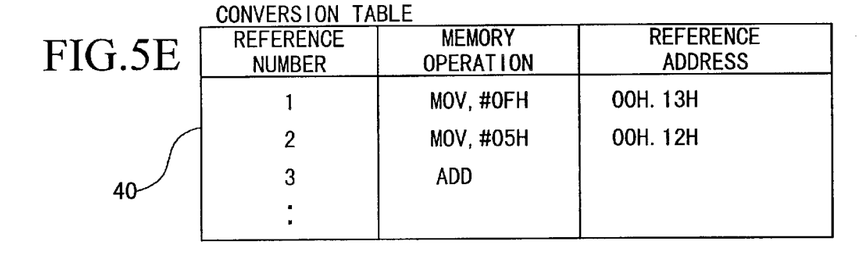
Figure 5F:
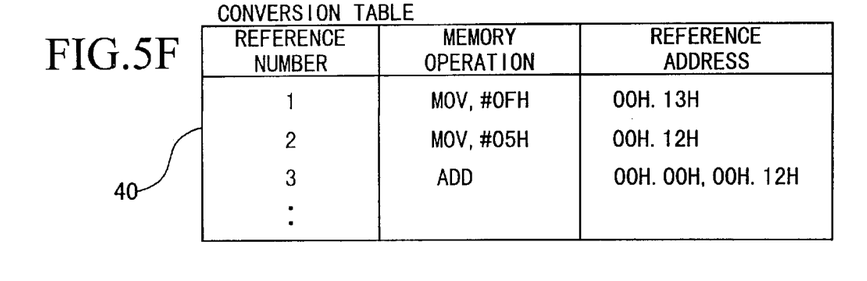
Figure 6:
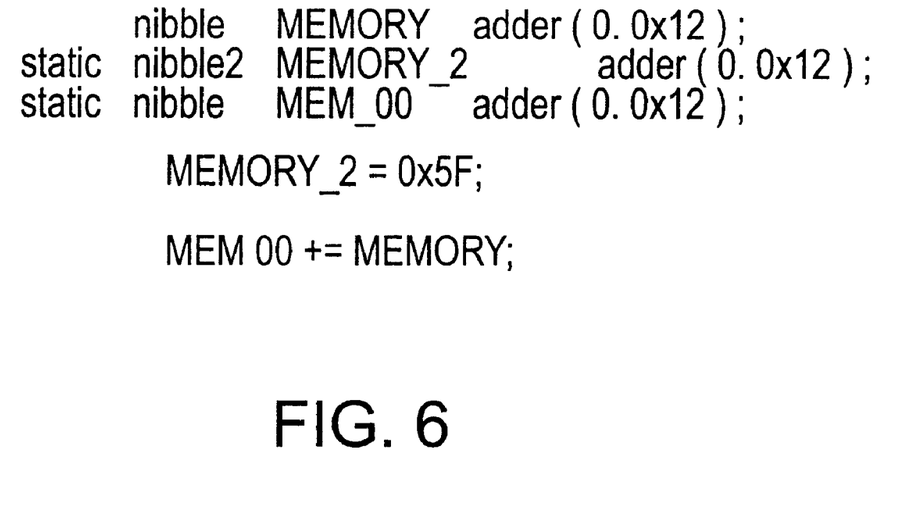
FIG. 6 shows an example of statements written in C language, which are produced by converting statements of assembly language.

The reference address registration step S32 registers with the column of "reference address" of the conversion memory 40, the reference address "00H. 12H" produced by the reference address analysis step S15 and the reference address "00H. 00H" produced by the constant reference address analysis step S21 (see FIG. 5F).

The conversion table retrieval step S33 performs retrieval operation on the content of the conversion table 40. Then, the consecutive statement decision step S34 makes a decision as to whether the registered content of the conversion table 40 can be converted to a single statement or not. At this time, the conversion table 40 does not store multiple statements which have not been yet processed. So, the step S34 determines that the content of the conversion table 40 cannot be converted to a single statement.

Thus, the system transfers control to step S37. In this case, analysis result of the aforementioned statement analysis step S1 coincides with the predetermined definition, so the single statement decision step S37 determines that single statement conversion is enabled.

Thus, the system proceeds to a single statement symbol analysis step S38. The step S38 recognizes that the address symbol creation step S22 creates the symbol "MEM_00" referring to the reference address "00H. 12H" while the symbol search step S14 extracts from that symbol table 10 the symbol "MEMORY" referring to the reference address "00H. 12H". Then, a single statement conversion processing step S39 converts it to a statement of the C language describing "MEM_00+=MEMORY".

Next, the symbol conversion step S6 converts the content of the symbol table 10 to a statement of the C language describing "static nibble MEM_00 addr (0.0x0)".

As described heretofore, the statements of the assembly language shown in FIG. 9 are completely converted to the statements of the C language.

Incidentally, it is possible to store programs of the source converter processing method show in FIG. 1, FIG. 2 and FIG. 3 on computer-readable (or machine-readable) recording media such as floppy disks, hard disks, optical disks and magneto-optic disks. Thus, the computer is capable of loading the programs recorded on the recording media to perform conversion of the source program in accordance with the source converter processing method of this invention.

Lastly, effects of the invention will be described as follows:

(1) This invention is capable of converting statements of symbol definition designating absolute addresses, written in the assembly language, to statements of the C language, so it is unnecessary to perform corrections on source programs written in the C language after conversion. Therefore, it is possible to reduce a number of steps for corrections and debugging of programs, hence, this invention offers an effect that reliability of the source programs is improved.

(2) This invention is designed to secure consecutive memory areas when performing conversion on statements of memory access designating relative addresses of symbols written in the assembly language. Therefore, the statements of the assembly language can be converted to statements of the C language in such a way that consecutive areas lie between the relative addresses and the addresses that are used as the basis for designation of the relative addresses. Thus, this invention offers an effect that programs corresponding to compilation results of the source programs after conversion can be operated in a normal manner.

(3) This invention is capable of dealing with statements of the assembly language that designate addresses using constants without designating symbols. That is, this invention is capable of converting the above statements of the assembly language to statements of the C language. Therefore, it is unnecessary to perform corrections on the source programs written in the C language after conversion. Thus, it is possible to reduce a number of steps for the corrections and debugging of the programs. So, this invention offers an effect that reliability of the source programs after conversion is improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A source converter processing method comprising the steps of:

analyzing a first statement written in an assembly language input thereto so as to provide analysis result;

detecting a name of a definition symbol based on the analysis result so that the name of the symbol is registered with a symbol table;

detecting a size of the definition symbol based on the analysis result, so that the size of the definition symbol is registered with the symbol table;

producing an absolute address of the definition symbol based on the analysis result, so that the absolute address is registered with the symbol table;

converting the first statement to a second statement written in a high-level language in accordance with registered content of the symbol table and a predetermined conversion method;

performing retrieval operation on the symbol table on the basis of the symbol name so as to detect a definition size and a definition address of a symbol corresponding to the symbol name;

producing a reference address based on the analysis result and the definition address;

producing a terminal address based on the definition size and the definition address;

performing comparison between the reference address and the terminal address, so that a decision is made based on comparison result as to whether a new symbol is created or not;

producing a definition size of the new symbol based on a difference between the reference address and the terminal address; and creating the new symbol on the basis of the symbol name, the definition size and the terminal address.

2. A source converter processing method according to claim 1 further comprising the steps of:

producing a constant reference address based on the analysis result, so that the constant reference address is registered with the symbol table;

obtaining a size and a name of the new symbol on the basis of the reference address, so that the size and the name of the new symbol are registered with the symbol table;

converting registered content of the symbol table to the second statement written in a high-level language in accordance with a predetermined conversion method; and replacing the constant reference symbol with the name of the new symbol so as to convert the first statement to the second statement.

3. A source converter processing method as in claim 1 further comprising:

obtaining an instruction for memory operation based on the analysis result;

registering the instruction for the memory operation with a conversion table;

registering the reference address with the conversion table;

performing retrieval operation on the conversion table so as to obtain a plurality of instructions for memory operations and a plurality of reference addresses; and if the plurality of instructions for memory operations and the plurality of reference addresses can be converted to a single statement, converting the first statement to the second statement.

4. A machine-readable media storing programs and data to cause a computer to perform a source converter processing method comprising the steps of:

analyzing a first statement written in an assembly language input thereto so as to provide analysis result;

detecting a symbol name based on the analysis result so that the name of the symbol is registered with a symbol table;

detecting a size of the definition symbol based on the analysis result, so that the size of the definition symbol is registered with the symbol table;

producing an absolute address of the definition symbol based on the analysis result, so that the absolute address is registered with the symbol table;

converting the first statement to a second statement written in a high-level language in accordance with registered content of the symbol table and a predetermined conversion method;

performing retrieval operation on the symbol table on the basis of the symbol name so as to detect a definition size and a definition address of a symbol corresponding to the symbol name;

producing a reference address based on the analysis result and the definition address;

producing a terminal address based on the definition size and the definition address;

performing comparison between the reference address and the terminal address, so that a decision is made based on comparison result as to whether a new symbol is created or not;

producing a definition size of the new symbol based on a difference between the reference address and the terminal address; and creating the new symbol on the basis of the symbol name, the definition size and the terminal address.

5. A machine-readable media storing programs and data to cause a computer to perform a source converter processing method according to claim 4 further comprising the steps of:

producing a constant reference address based on the analysis result, so that the constant reference address is registered with the symbol table;

obtaining a size and a name of the new symbol on the basis of the reference address, so that the size and the name of the new symbol are registered with the symbol table;

converting registered content of the symbol table to the second statement written in the high-level language in accordance with a predetermined conversion method; and replacing the constant reference symbol with the name of the new symbol so as to convert the first statement to the second statement.

6. A machine-readable media storing programs and data to cause a computer to perform a source converter processing method as in claim 4 further comprising:

obtaining an instruction for memory operation based on the analysis result;

registering the instruction for the memory operation with a conversion table;

registering the reference address with the conversion table;

performing retrieval operation on the conversion table so as to obtain a plurality of instructions for memory operations and plurality of reference addresses; and if the plurality of instructions for memory operations and the plurality of reference addresses can be converted to a single statement, converting the first statement to the second statement.

7. A source converter processing method comprising the steps of:

analyzing a first statement which is input thereto and is written in an assembly language;

detecting a symbol definition on the basis of analysis result of the first statement;

registering information regarding the symbol definition with a symbol table; and converting registered content of the symbol table to a second statement written in a C language, wherein the information contains a name, a definition size and a definition address with regard to the symbol definition.

8. A source converter processing method according to claim 7 further comprising the steps of:

detecting a name of a reference symbol contained in the first statement that regards memory operation;

reading a definition size and a definition address based on the name of the reference symbol with reference to the symbol table;

producing a reference address based on the definition address; and producing a terminal address based on the definition address and the definition size which are extracted from the symbol table with regard to the reference symbol; and creating a new symbol whose definition size corresponds to a difference between the reference address and the terminal address, wherein information regarding the new symbol is registered with the symbol table.

9. A source converter processing method according to claim 7 further comprising the steps of:

producing a reference address based on the first statement that regards memory operation; and producing a new symbol based on the reference address, wherein information regarding the new symbol is registered with the symbol table.

10. A source converter processing method according to claim 8 or 9 further comprising the steps of:

extracting from the first statement, information regarding the memory operation, which is registered with a conversion table;

registering the reference address with the conversion table;

referring to the conversion table to determine whether to enable consecutive statement conversion; and performing the consecutive statement conversion, so that the first statement is converted to the second statement written in the second language.

11. A source converter processing method according to claim 8 or 9 further comprising the steps of:

extracting from the first statement, information regarding the memory operation, which is registered with a conversion table;

registering the reference address with the conversion table;

referring to the conversion table to determine whether to enable single statement conversion; and performing the single statement conversion, so that the first statement is converted to the second statement written in the second language.

* * * * *